(12) United States Patent
Han et al.

(10) Patent No.: US 11,765,803 B2
(45) Date of Patent: Sep. 19, 2023

(54) LED DRIVE CIRCUIT

(71) Applicant: INVENTRONICS (HANGZHOU), INC., Zhejiang (CN)

(72) Inventors: Jian Han, Zhejiang (CN); Ping Fu, Zhejiang (CN); Delai Jiang, Zhejiang (CN)

(73) Assignee: INVENTRONICS (HANGZHOU), INC., Zhejiang (CN)

( * ) Notice: Subject to any disclaimer, the term of this patent is extended or adjusted under 35 U.S.C. 154(b) by 0 days.

(21) Appl. No.: 17/917,935

(22) PCT Filed: Jul. 7, 2021

(86) PCT No.: PCT/CN2021/104890
§ 371 (c)(1),
(2) Date: Oct. 9, 2022

(87) PCT Pub. No.: WO2022/057401
PCT Pub. Date: Mar. 24, 2022

(65) Prior Publication Data
US 2023/0132258 A1 Apr. 27, 2023

(30) Foreign Application Priority Data
Sep. 16, 2020 (CN) .......................... 202010973166.7

(51) Int. Cl.
*H05B 45/30* (2020.01)
*H05B 45/385* (2020.01)

(52) U.S. Cl.
CPC ................................ *H05B 45/385* (2020.01)

(58) Field of Classification Search
CPC .... H05B 45/38; H05B 45/355; H05B 45/375; H05B 45/385; H05B 45/395; H05B 45/3725
See application file for complete search history.

(56) References Cited

U.S. PATENT DOCUMENTS

| 9,203,321 | B1 | 12/2015 | Xiong |
| 10,362,644 | B1 * | 7/2019 | Xiong ..................... H05B 45/59 |

(Continued)

FOREIGN PATENT DOCUMENTS

| CN | 109712574 A | 5/2019 |
| CN | 110798947 A | 2/2020 |

(Continued)

OTHER PUBLICATIONS

International Search Report for PCT/CN2021/104890 dated Oct. 9, 2021, ISA/CN.

*Primary Examiner* — Tung X Le
(74) *Attorney, Agent, or Firm* — Yue (Robert) Xu; Apex Attorneys at Law, LLP

(57) ABSTRACT

An LED drive circuit, comprising: a Flyback circuit that has a current-limiting mode and a constant-voltage mode, a non-isolated DC-DC circuit, and a control circuit. The control circuit is used to detect the output voltage of the Flyback circuit, and, when the output voltage of the Flyback circuit is greater than or equal to a first preset voltage value, control the Flyback circuit to operate in the constant-voltage mode; the control circuit is further used to detect the switch transistor current or output current of the Flyback circuit, and, when the output current of the Flyback circuit is greater than a first preset current value, control the Flyback circuit to operate in the current-limiting mode.

8 Claims, 4 Drawing Sheets

(56) References Cited

U.S. PATENT DOCUMENTS

| | | | |
|---|---|---|---|
| 2010/0026208 A1* | 2/2010 | Shteynberg | H05B 45/3725 315/297 |
| 2011/0080110 A1* | 4/2011 | Nuhfer | H05B 45/44 315/291 |
| 2011/0193542 A1* | 8/2011 | Kwok | H05B 47/17 323/284 |
| 2013/0119868 A1 | 5/2013 | Saxena et al. | |
| 2014/0232270 A1* | 8/2014 | Kimura | H05B 45/20 315/122 |
| 2021/0307142 A1* | 9/2021 | Bocock | H05B 45/375 |

FOREIGN PATENT DOCUMENTS

| | | |
|---|---|---|
| CN | 110856309 A | 2/2020 |
| CN | 111901933 A | 11/2020 |

\* cited by examiner

LED DRIVE CIRCUIT

The present application is the national phase of International Patent Application No. PCT/CN2021/104890, titled "LED DRIVE CIRCUIT", filed on Jul. 7, 2021, which claims priority to Chinese Patent Application No. 202010973166.7, titled "LED DRIVE CIRCUIT", filed on Sep. 16, 2020 with the Chinese Patent Office, both of which are incorporated herein by reference in their entireties.

FIELD

The present disclosure relates to the technical field of LEDs, and in particular to an LED driving circuit.

BACKGROUND

In practical applications, it is common that an LED (Light Emitting Diode) driving control circuit is formed by a front-stage Flyback circuit and a rear-stage non-isolated DC-DC circuit. The Flyback circuit outputs a stable direct current voltage, and the non-isolated DC-DC circuit converts the direct current voltage outputted by the Flyback circuit to a constant current to provide a stable power source to an LED load.

In the conventional technology, it often occurs that the front-stage Flyback circuit has enters into a limited-current mode before the rear-stage non-isolated DC-DC circuit outputs a current large enough to drive a load, resulting in a problem that the LED driving circuit outputs with a reduced power and fails to achieve an expected output effect. At present, there is no effective solution for the above technical defect.

Therefore, how to avoid that the front-stage Flyback circuit enters into a limited-current mode before the rear-stage non-isolated DC-DC circuit in the LED driving circuit outputs a current large enough to drive a load is a technical problem urgently to be solved by those skilled in the art.

SUMMARY

In view of this, an LED driving circuit is provided according to the present disclosure to avoid that the front-stage Flyback circuit enters into a limited-current mode before the rear-stage non-isolated DC-DC circuit in the LED driving circuit outputs a current large enough to drive a load. The following technical solutions are provided.

An LED driving circuit is provided according to the present disclosure. The LED driving circuit includes: a Flyback circuit, a non-isolated DC-DC circuit, and a control circuit. The Flyback circuit operates in a limited-current mode or a constant-voltage mode, and is configured to output a direct current voltage. The non-isolated DC-DC circuit is configured to convert the direct current voltage to a target direct current power to power an LED load. The control circuit is configured, when the LED driving circuit is started, to: detect an output voltage of the Flyback circuit to obtain a detected output voltage, and control the Flyback circuit to operate in the constant-voltage mode and control the non-isolated DC-DC circuit to start operating in a case that the detected output voltage is greater than or equal to a first predetermined voltage; and detect a switch current or an output current of the Flyback circuit to obtain a detected output current, and control the Flyback circuit to operate in the limited-current mode to output with a reduced power in a case that the detected output current is greater than a first predetermined current. The non-isolated DC-DC circuit outputs a second predetermined current, and the second predetermined current is greater than the first predetermined current.

Preferably, in a case that the non-isolated DC-DC circuit has a boost topology structure, the first predetermined voltage is equal to 20% to 80% of a maximum output voltage of the non-isolated DC-DC circuit.

Preferably, in a case that the non-isolated DC-DC circuit has a buck topology structure, the first predetermined voltage is equal to 1.1 times to 2 times a maximum output voltage of the non-isolated DC-DC circuit.

Preferably, the first predetermined voltage is equal to an output voltage of the Flyback circuit operating in the constant-voltage mode.

Preferably, the Flyback circuit is a primary side feedback control circuit or a secondary side feedback control circuit.

Preferably, the non-isolated DC-DC circuit is a Buck circuit.

Preferably, the control circuit further includes a mode control module. The mode control module is configured to control the Flyback circuit to operate in the limited-current mode in a case that the output current or the switch current of the Flyback circuit is greater than a third predetermined current, and control the Flyback circuit to operate in the constant-voltage mode in a case that the output current or the switch current of the Flyback circuit is less than or equal to the third predetermined current.

Preferably, in a case that the Flyback circuit is the primary side feedback control circuit, the mode control module includes: a first voltage loop, a first current loop, and a first driving unit. The first voltage loop is configured to output a constant voltage based on the output voltage of the Flyback circuit and a first reference voltage. The first current loop is configured to detect the switch current of the Flyback circuit, and feedback a first feedback signal to the first driving unit based on the switch current of the Flyback circuit and a first reference current. The first driving unit is configured to control the Flyback circuit to operate in the limited-current mode by using the first current loop in a case that it is determined that the switch current of the Flyback circuit is greater than the third predetermined current based on the first feedback signal, and control the Flyback circuit to operate in the constant-voltage mode by using the first voltage loop in a case that it is determined that the switch current of the Flyback circuit is less than or equal to the third predetermined current based on the first feedback signal.

Preferably, in a case that the Flyback circuit is the secondary side feedback control circuit, the mode control module includes: a second voltage loop, a second current loop, an optocoupler, and a second driving unit. The second voltage loop is configured to output a constant voltage based on the output voltage of the Flyback circuit and a second reference voltage. The second current loop is configured to detect the output current of the Flyback circuit, and feedback a second feedback signal to the optocoupler based on the output current of the Flyback circuit and a second reference current. The photocoupler is configured to transmit the second feedback signal to the second driving unit. The second driving unit is configured to control the Flyback circuit to operate in the limited-current mode by using the second current loop in a case that it is determined that the output current of the Flyback circuit is greater than the third predetermined current based on the second feedback signal, and control the Flyback circuit to operate in the constant-voltage mode by using the second voltage loop in a case that it is determined that the output current of the Flyback circuit is less than or equal to the third predetermined current based on the second feedback signal.

It can be seen that in the LED driving circuit according to the present disclosure, the Flyback circuit is controlled to operate in the constant-voltage mode and the non-isolated DC-DC circuit is controlled to start operating in a case that the output voltage of the Flyback circuit is greater than or equal to a first predetermined voltage, and the Flyback circuit is controlled to operate in the limited-current mode to output with a reduced power in a case that the output current of the Flyback circuit is greater than a first predetermined current. The second predetermined current outputted by the non-isolated DC-DC circuit is greater than the first predetermined current. With the configuration according to the present disclosure, the rear-stage non-isolated DC-DC circuit is started to operate in a case that the output voltage of the front-stage Flyback circuit is greater than or equal to the first predetermined voltage, and the rear-stage non-isolated DC-DC circuit does not operate and the Flyback circuit operates in a no-load state in a case that the output voltage of the front-stage Flyback circuit is less than the first predetermined voltage, thereby avoiding that the front-stage Flyback circuit enters into the limited-current mode before the rear-stage non-isolated DC-DC circuit in the LED driving circuit outputs a current large enough to drive a load.

BRIEF DESCRIPTION OF THE DRAWINGS

In order to more clearly explain technical solutions in the embodiments of the present disclosure or in the conventional technology, the accompanying drawings referred to for describing the embodiments or the conventional technology are briefly described hereinafter. Apparently, the accompanying drawings in the following description are only embodiments of the present disclosure. Other drawings may be obtained for those of ordinary skill in the art based on the provided drawings without any creative efforts.

DETAILED DESCRIPTION OF THE EMBODIMENTS

The technical solutions in the embodiments of the present disclosure will be clearly and completely described hereinafter with reference to the drawings in the embodiments according to the present disclosure. Apparently, the described embodiments are only a part of the embodiments of the present disclosure, but not all of the embodiments. Based on the embodiments in the present disclosure, all other embodiments obtained by those of ordinary skill in the art without creative effects fall within the protection scope of the present disclosure.

Figure 1:
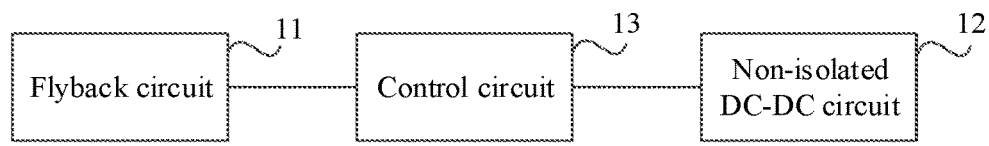
FIG. 1 is a structural diagram of an LED driving circuit according to an embodiment of the present disclosure.

Reference is made to FIG. 1, which is a structural diagram of an LED driving circuit according to an embodiment of the present disclosure. The LED driving circuit includes a Flyback circuit 11, a non-isolated DC-DC circuit 12, and a control circuit 13.

The Flyback circuit 11 operates in a limited-current mode or a constant-voltage mode, and is configured to output a direct current voltage.

The non-isolated DC-DC circuit 12 is configured to convert the direct current voltage to a target direct current power to power an LED load.

The control circuit 13 is configured, when the LED driving circuit is started, to: detect an output voltage of the Flyback circuit 11 to obtain a detected output voltage, and control the Flyback circuit 11 to operate in the constant-voltage mode and control the non-isolated DC-DC circuit 12 to start operating in a case that the detected output voltage is greater than or equal to a first predetermined voltage; and detect a switch current or an output current of the Flyback circuit 11 to obtain a detected output current, and control the Flyback circuit 11 to operate in the limited-current mode to output with a reduced power in a case that the detected output current is greater than a first predetermined current. The non-isolated DC-DC circuit 12 outputs a second predetermined current, and the second predetermined current is greater than the first predetermined current.

In the embodiment, a new LED driving circuit is provided. With the LED driving circuit according to the embodiment, it can be avoided that the front-stage Flyback circuit enters into a limited-current mode before the rear-stage non-isolated DC-DC circuit in the LED driving circuit outputs a current large enough to drive a load.

Specifically, a front-stage Flyback circuit 11, a rear-stage non-isolated DC-DC circuit 12 and a control circuit 13 are arranged in the LED driving circuit. The front-stage Flyback circuit 11 may operate in a limited-current mode or a constant-voltage mode, and is configured to output a direct current voltage. The rear-stage non-isolated DC-DC circuit 12 is configured to convert the direct current voltage outputted by the front-stage Flyback circuit 11 to a target direct current power, and supply power to an LED load. Since the front-stage Flyback circuit 11 and the rear-stage non-isolated DC-DC circuit 12 are technical contents well known to those skilled in the art, the front-stage Flyback circuit 11 and the rear-stage non-isolated DC-DC circuit 12 are not described in detail in the embodiments of the present disclosure.

The control circuit 13 is configured, when the LED driving circuit is started, to: detect an output voltage of the Flyback circuit 11 to obtain a detected output voltage, and control the Flyback circuit 11 to operate in the constant-voltage mode and control the non-isolated DC-DC circuit 12 to start operating in a case that the detected output voltage is greater than or equal to a first predetermined voltage; and detect a switch current or an output current of the Flyback circuit 11 to obtain a detected output current, and control the Flyback circuit 11 to operate in the limited-current mode to output with a reduced power in a case that the detected output current is greater than a first predetermined current.

It can be understood that with the control circuit 13 arranged in the LED driving circuit, in a case that the direct current voltage outputted by the front-stage Flyback circuit 11 is less than the first predetermined voltage, the rear-stage non-isolated DC-DC circuit 12 does not operate, that is, the Flyback circuit 11 operates in a no-load state. Only in a case that the direct current voltage outputted by the front-stage Flyback circuit 11 is greater than or equal to the first predetermined voltage, the rear-stage non-isolated DC-DC circuit 12 starts operating. That is, when the LED driving circuit is started, only after the front-stage Flyback circuit 11 operates in the constant-voltage mode (that is, only after the Flyback circuit 11 is started up), the rear-stage non-isolated DC-DC circuit 12 starts operating. It should be understood that when the rear-stage non-isolated DC-DC circuit 12 is to start operating, since the front-stage Flyback circuit 11 has started up and operates in the constant-voltage mode, the front-stage Flyback circuit 11 provides the rear-stage non-isolated DC-DC circuit 12 with a direct current voltage with a stable amplitude, the rear-stage non-isolated DC-DC circuit 12 may start normally and may output a current large enough to drive a load. With the configuration according to the present disclosure, it can be avoided that the front-stage Flyback circuit 11 enters into a limited-current mode before the rear-stage non-isolated DC-DC circuit 12 in the LED driving circuit outputs a current large enough to drive a load.

It can be seen that in the LED driving circuit according to the embodiments of the present disclosure, the Flyback circuit is controlled to operate in the constant-voltage mode and the non-isolated DC-DC circuit is controlled to start operating in a case that the output voltage of the Flyback circuit is greater than or equal to a first predetermined voltage, and the Flyback circuit is controlled to operate in the limited-current mode to output with a reduced power in a case that the output current of the Flyback circuit is greater than a first predetermined current. The second predetermined current outputted by the non-isolated DC-DC circuit is greater than the first predetermined current. With the configuration according to the present disclosure, the rear-stage non-isolated DC-DC circuit is started to operate in a case that the output voltage of the front-stage Flyback circuit is greater than or equal to the first predetermined voltage, and the rear-stage non-isolated DC-DC circuit does not operate and the Flyback circuit operates in a no-load state in a case that the output voltage of the front-stage Flyback circuit is less than the first predetermined voltage, thereby avoiding that the front-stage Flyback circuit enters into the limited-current mode before the rear-stage non-isolated DC-DC circuit in the LED driving circuit outputs a current large enough to drive a load.

Based on the above embodiments, the technical solution is further described and optimized in an embodiment of the present disclosure. In a preferred embodiment, in a case that the non-isolated DC-DC circuit has a boost topology structure, the first predetermined voltage is equal to 20% to 80% of a maximum output voltage of the non-isolated DC-DC circuit.

In actual operations, in a case that the non-isolated DC-DC circuit has a boost topology structure, for example, the non-isolated DC-DC circuit is a BOOST circuit, the first predetermined voltage is set to be equal to 20% to 80% of a maximum output voltage of the non-isolated DC-DC circuit in the embodiment. It can be seen that based on a lot of practical experience, in a case that the non-isolated DC-DC circuit has a boost topology structure, the operation efficiency of the LED driving circuit can be improved if the first predetermined voltage is set to be 20% to 80% of the maximum output voltage of the non-isolated DC-DC circuit. Therefore, the first predetermined voltage is set to be 20% to 80% of the maximum output voltage of the non-isolated DC-DC circuit in the embodiment.

Based on the above embodiments, the technical solution is further described and optimized in an embodiment of the present disclosure. In a preferred embodiment, in a case that the non-isolated DC-DC circuit has a buck topology structure, the first predetermined voltage is equal to 1.1 times to 2 times a maximum output voltage of the non-isolated DC-DC circuit.

In a case that the non-isolated DC-DC circuit has a buck topology structure, the first predetermined voltage is set to be equal to 1.1 times to 2 times the maximum output voltage of the non-isolated DC-DC circuit in the embodiment. It can be seen that based on a lot of practical experience, in a case that the non-isolated DC-DC circuit has a buck topology structure and the first predetermined voltage is set be to 1.1 times to 2 times the maximum output voltage of the non-isolated DC-DC circuit, the operation efficiency of the rear-stage non-isolated DC-DC circuit can be improved. Therefore, the overall operation efficiency of the LED driving circuit is improved based on the above configuration in the embodiment. It should be noted that in actual operations, the buck topology structure includes, but is not limited to, a BUCK circuit.

Based on the above embodiments, the technical solution is further described and optimized in an embodiment of the present disclosure. In a preferred embodiment, the first predetermined voltage is equal to an output voltage of the Flyback circuit operating in the constant-voltage mode.

In actual operations, the first predetermined voltage may be set to be equal to the output voltage of the front-stage Flyback circuit operating in the constant-voltage mode. After the first predetermined voltage is set to be the output voltage of the Flyback circuit operating in the constant-voltage mode, the control circuit controls the rear-stage non-isolated DC-DC circuit to start operating only in a case that the direct current voltage outputted by the front-stage Flyback circuit is greater than or equal to the output voltage of the Flyback circuit operating in the constant-voltage mode. Therefore, based on the above configuration in the embodiment, it can be avoided that the front-stage Flyback circuit enters into a limited-current mode before the rear-stage non-isolated DC-DC circuit in the LED driving circuit outputs a current large enough to drive a load.

Based on the above embodiments, the technical solution is described and optimized in an embodiment of the present disclosure. In a preferred embodiment, the Flyback circuit is a primary side feedback control circuit or a secondary side feedback control circuit.

In practical applications, the Flyback circuit may be configured as a primary side feedback control circuit or a secondary side feedback control circuit. After the Flyback circuit is configured as the primary side feedback control circuit or the secondary side feedback control circuit, the control circuit may have a structure having a first voltage division module and a first control unit.

The first voltage division module is configured to detect the direct current voltage outputted by the front-stage Flyback circuit, and the first voltage division module, after detecting the direct current voltage outputted by the front-stage Flyback circuit, feedback the direct current voltage outputted by the front-stage Flyback circuit to the first control unit. In a case of determining that the direct current voltage outputted by the front-stage Flyback circuit is less than the first predetermined voltage, the first control unit controls the non-isolated DC-DC circuit to stop operating. In a case of determining that the direct current voltage outputted by the front-stage Flyback circuit is greater than or equal to the first predetermined voltage, the first control unit controls the non-isolated DC-DC circuit to start operating.

Figure 2:
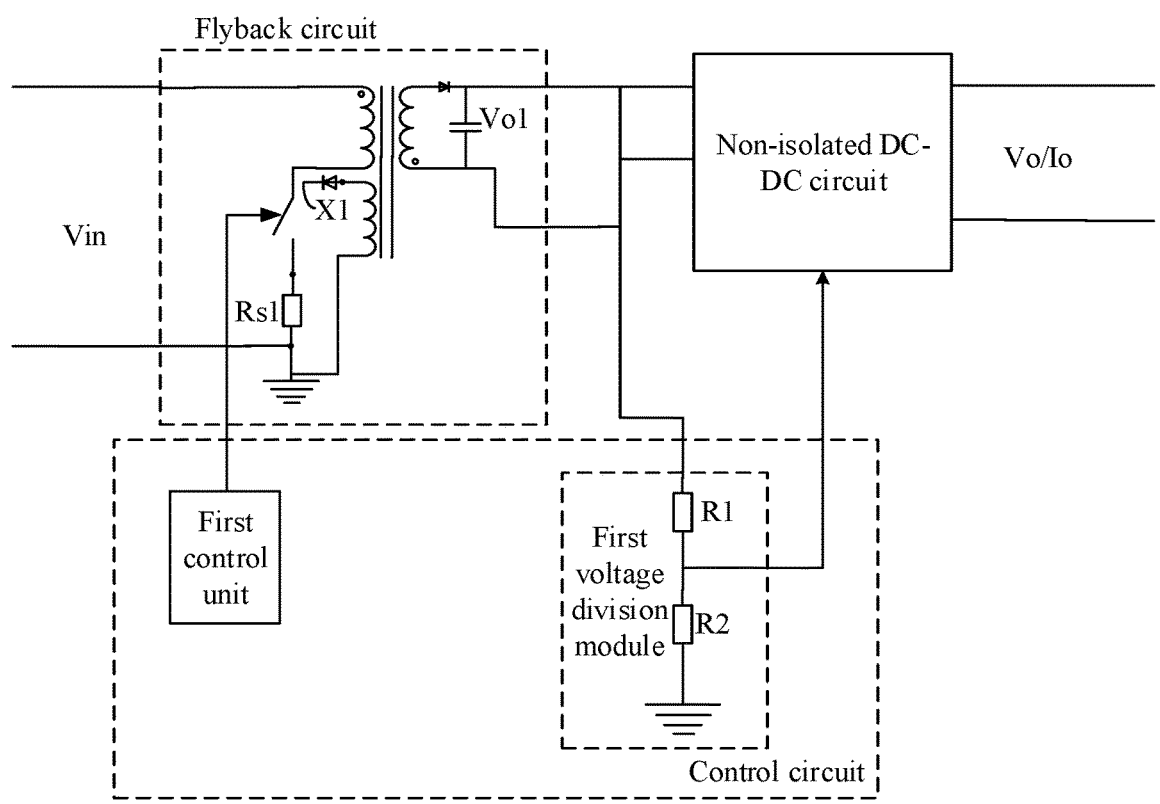
FIG. 2 is a structural diagram of an LED driving circuit in a case that a Flyback circuit is a primary side feedback control circuit according to an embodiment of the present disclosure.

In actual operations, the first voltage division module may be configured to have a voltage division resistor structure including a first resistor R1 and a second resistor R2. Reference is made to FIG. 2, which is a structural diagram of an LED driving circuit in a case that a Flyback circuit is a primary side feedback control circuit according to an embodiment of the present disclosure.

Based on the above embodiments, the technical solution is further described and optimized in an embodiment of the present disclosure. In a preferred embodiment, the non-isolated DC-DC circuit is a Buck circuit.

Figure 3:
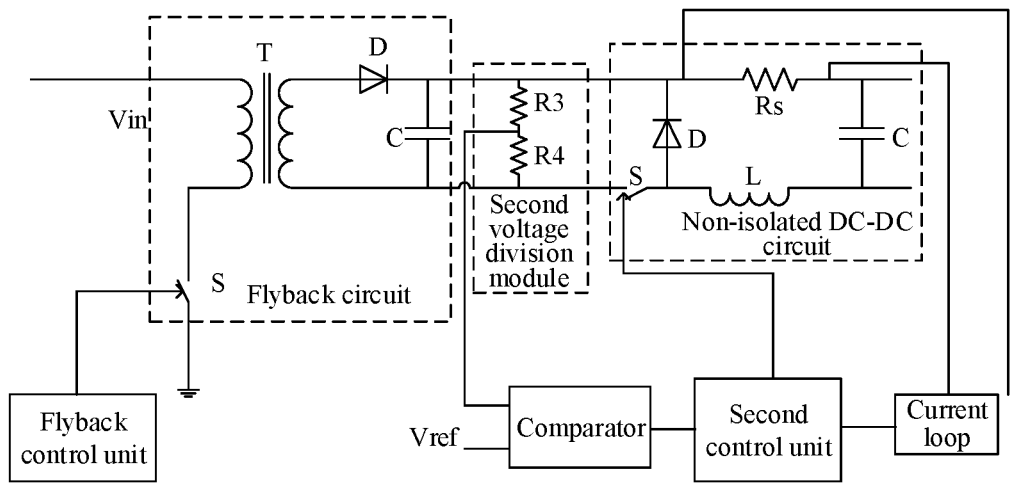
FIG. 3 is a structural diagram of an LED driving circuit in a case that a Flyback circuit is a Buck circuit according to an embodiment of the present disclosure.

In practical applications, the non-isolated DC-DC circuit may be configured to have a structure of a Buck circuit. In a case that the non-isolated DC-DC circuit has a structure of the Buck circuit, the control circuit may be configured as a structure having a second voltage division module, a comparator, and a second control unit. Reference is made to FIG. 3, which is a structural diagram of an LED driving circuit in a case that a Flyback circuit is a Buck circuit according to an embodiment of the present disclosure.

The second voltage division module is configured to detect the direct current voltage outputted by the front-stage Flyback circuit, and feedback the detected direct current voltage to the comparator. After receiving the direct current voltage detected by the second voltage division module, the comparator compares the division voltage with the first predetermined voltage to obtain a first comparison result, and feedback the first comparison result to the second control unit. After receiving the first comparison result fed back by the comparator, the second control unit determines whether the direct current voltage outputted by the front-stage Flyback circuit is less than the first predetermined voltage based on the first comparison result. In a case that the direct current voltage outputted by the front-stage Flyback circuit is less than the first predetermined voltage, the second control unit controls the non-isolated DC-DC circuit to stop operating. In a case that the direct current voltage outputted by the front-stage Flyback circuit is greater than or equal to the first predetermined voltage, the second control unit controls the non-isolated DC-DC circuit to start operating. Specifically, in actual operations, the second voltage division module may be configured to have a voltage division resistor structure, that is, the second voltage division module is constructed by a resistor R3 and a resistor R4. Reference is made to FIG. 3 for details.

In addition, in actual operations, in order to further ensure the safety and reliability of the LED driving circuit in operation, a current loop and a Flyback control unit may be further arranged in the control circuit. The current loop is configured to measure the output current of the rear-stage non-isolated DC-DC circuit, and feedback the detected output current of the rear-stage non-isolated DC-DC circuit to the second control unit. Thus, the second control unit may obtain the output current of the rear-stage non-isolated DC-DC circuit in time and transmit a corresponding control signal to a switch S in the non-isolated DC-DC circuit based on the output current of the non-isolated DC-DC circuit fed back by the current loop, so that the rear-stage non-isolated DC-DC circuit outputs a target current with a stable amplitude to supply power to an LED load. The Flyback control unit is configured to control the Flyback circuit to operate in the limited-current mode in a case that an output current or a switch current of the Flyback circuit is greater than the first predetermined current, and control the Flyback circuit to operate in the constant-voltage mode in a case that the output current or the switch current of the Flyback circuit is less than or equal to the first predetermined current.

In addition, in actual operations, a constant-voltage control module may be further arranged in the control circuit. The constant-voltage control module compares the direct current voltage outputted by the front-stage Flyback circuit with a reference voltage to obtain a second comparison result, and controls the front-stage Flyback circuit to operate in the constant-voltage mode based on the second comparison result.

Figure 4:
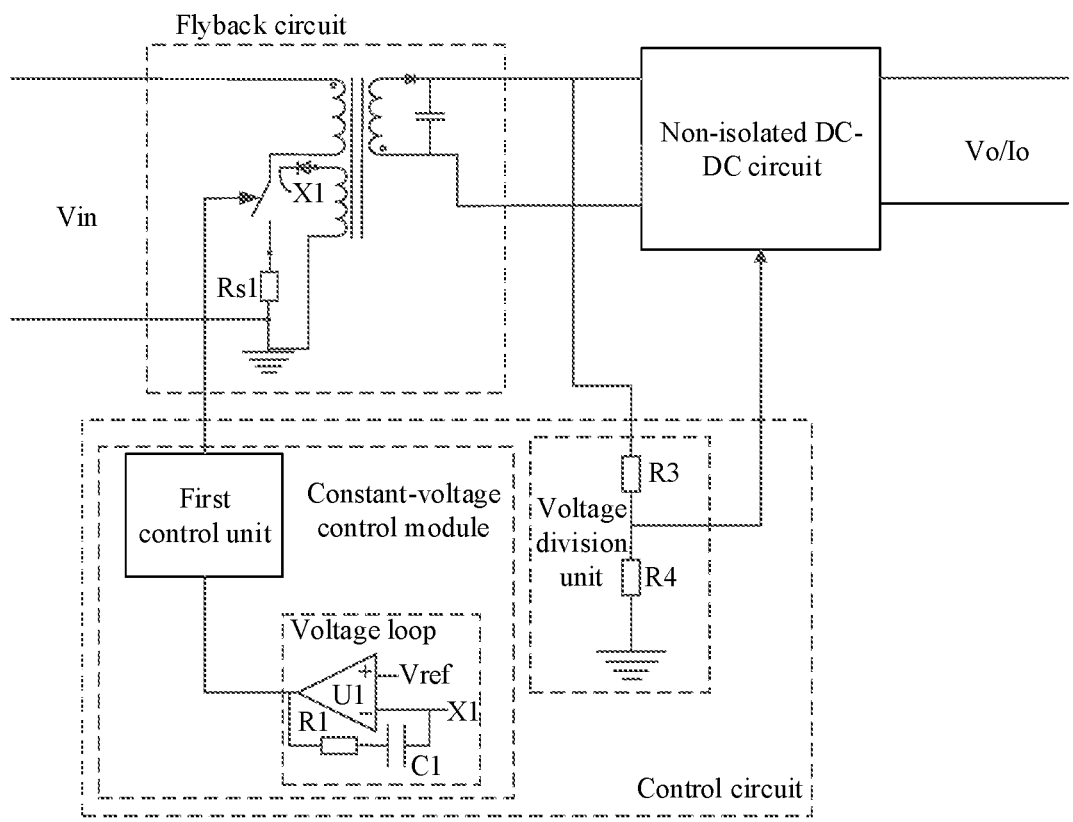
FIG. 4 is a structural diagram of an LED driving circuit in a case that a Flyback circuit is a primary side feedback control circuit and the LED driving circuit is arranged with a constant-voltage control module according to an embodiment of the present disclosure.

Reference is made to FIG. 4, which is a structural diagram of an LED driving circuit in a case that a Flyback circuit is a primary side feedback control circuit and the LED driving circuit is arranged with a constant-voltage control module according to an embodiment of the present disclosure. Specifically, a voltage loop and a first control unit may be arranged in the constant-voltage control module. The voltage loop is configured to detect the direct current voltage outputted by the front-stage Flyback circuit, that is, detect a voltage at point X shown in FIG. 4. After detecting the direct current voltage outputted by the front-stage Flyback circuit, the voltage loop compares the direct current voltage outputted by the front-stage Flyback circuit with a reference voltage Vref, and determines whether the direct current voltage outputted by the front-stage Flyback circuit is equal to the reference voltage Vref. In a case that the direct current voltage outputted by the front-stage Flyback circuit is not equal to the reference voltage Vref, the first control unit transmits a control signal to the front-stage Flyback circuit to control the front-stage Flyback circuit to operate in the constant-voltage mode. Due to that the operation of the constant-voltage control module in a case that the Flyback circuit is a secondary side feedback control circuit is same as the above operation of the constant-voltage control module, the constant-voltage control module in the case that the Flyback circuit is a secondary side feedback control circuit is not described in detail in the embodiments. Apparently, with the above configuration according to the embodiments of the present disclosure, the stability and reliability of the LED driving circuit in operation can be further ensured.

Based on the above embodiments, the technical solutions is further described and optimized in an embodiment of the present disclosure. In a preferred embodiment, the control circuit further includes a mode control module. The mode control module is configured to control the Flyback circuit to operate in the limited-current mode in a case that the output current or the switch current of the Flyback circuit is greater than a third predetermined current, and control the Flyback circuit to operate in the constant-voltage mode in a case that the output current or the switch current of the Flyback circuit is less than or equal to the third predetermined current.

In the embodiment, a mode control module is further arranged in the control circuit. The mode control module is configured to control the front-stage Flyback circuit to operate in the limited-current mode in a case that the output current or the switch current of the front-stage Flyback circuit is greater than a third predetermined current, and control the front-stage Flyback circuit to operate in the constant-voltage mode in a case that the output current or the switch current of the front-stage Flyback circuit is less than or equal to the third predetermined current.

Apparently, with the technical solution according to the embodiment of the present disclosure, the safety of the LED driving circuit in operation can be further ensured.

Figure 5:
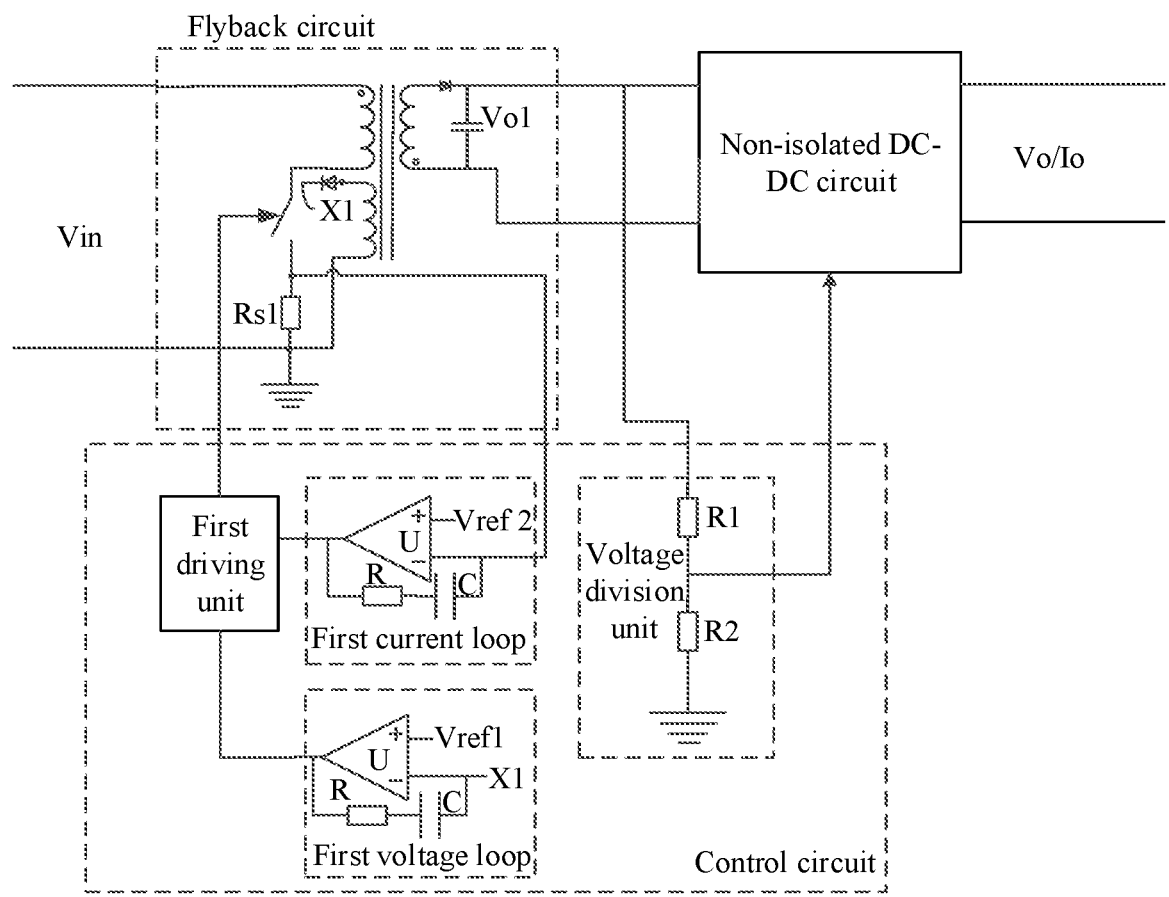
FIG. 5 is a structural diagram of an LED driving circuit in a case that a Flyback circuit is a primary side feedback control circuit and the LED driving circuit is arranged with a mode control module according to an embodiment of the present disclosure.

Reference is made to FIG. 5, which is a structural diagram of an LED driving circuit in a case that a Flyback circuit is a primary side feedback control circuit and the LED driving circuit is arranged with a mode control module according to an embodiment of the present disclosure. As a preferred embodiment, in a case that the Flyback circuit is a primary side feedback control circuit, the mode control module includes: a first voltage loop, a first current loop, and a first driving unit.

The first voltage loop is configured to output a constant voltage based on the output voltage of the Flyback circuit and a first reference voltage.

The first current loop is configured to detect the switch current of the Flyback circuit, and feedback a first feedback signal back to the first driving unit based on the switch current of the Flyback circuit and a first reference current.

The first driving unit is configured to control the Flyback circuit to operate in the limited-current mode by using the first current loop in a case that it is determined that the switch current of the Flyback circuit is greater than the third predetermined current based on the first feedback signal, and control the Flyback circuit to operate in the constant-voltage mode by using the first voltage loop in a case that it is determined that the switch current of the Flyback circuit is less than or equal to the third predetermined current based on the first feedback signal.

In the embodiment, an implementation of the mode control module is provided. That is, in a case that the front-stage Flyback circuit is a primary side feedback control circuit, the first voltage loop, the first current loop, and the first driving unit are arranged in the mode control module. The first voltage loop is configured to output a constant voltage based on the output voltage of the Flyback circuit and the first reference voltage Vref1. The first current loop is configured to detect the switch current of the Flyback circuit, and feedback the first feedback signal to the first driving unit based on the switch current of the Flyback circuit and the first reference current Vref2. After receiving the first feedback signal from the first current loop, the first driving unit determines whether the switch current of the front-stage Flyback circuit is greater than the third predetermined current based on the first feedback signal. In a case that the switch current of the front-stage Flyback circuit is greater than the third predetermined current, the first driving unit controls the front-stage Flyback circuit to operate in the limited-current mode by using the first current loop. In a case that that the switch current of the front-stage Flyback circuit is less than or equal to the third predetermined current, the first driving unit controls the Flyback circuit to operate in the constant-voltage mode by using the first voltage loop. In actual operations, the first voltage loop may be constructed by using a comparator U, a resistor R and a capacitor C and the first current loop may be constructed by using a comparator U, a resistor R and a capacitor C, which may refer to FIG. 5 and is not described in detail herein.

Figure 6:
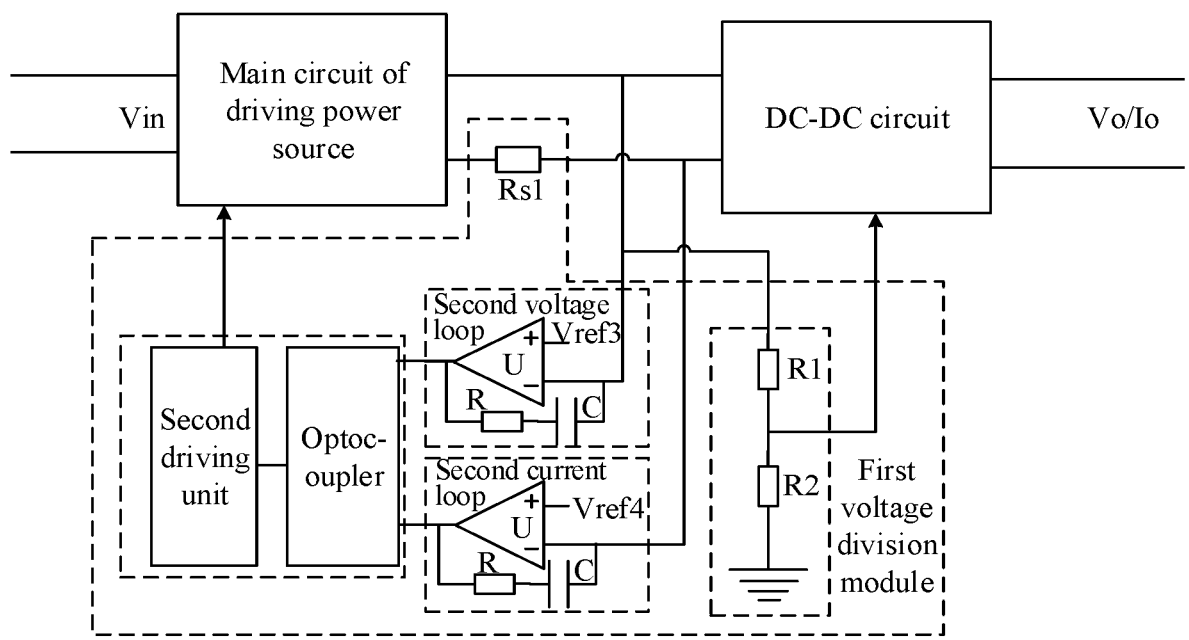
FIG. 6 is a structural diagram of an LED driving circuit in a case that a Flyback circuit is a secondary side feedback control circuit and the LED driving circuit is arranged with a mode control module according to an embodiment of the present disclosure.

Reference is made to FIG. 6, which is a structural diagram of an LED driving circuit in a case that a Flyback circuit is a secondary side feedback control circuit and the LED driving circuit is arranged with a mode control module according to an embodiment of the present disclosure. As a preferred embodiment, in a case that the Flyback circuit is a secondary side feedback control circuit, the mode control module includes: a second voltage loop, a second current loop, an optocoupler, and a second driving unit.

The second voltage loop is configured to output a constant voltage based on the output voltage of the Flyback circuit and a second reference voltage.

The second current loop is configured to detect the output current of the Flyback circuit, and feedback a second feedback signal to the optocoupler based on the output current of the Flyback circuit and a second reference current.

The optocoupler is configured to transmit the second feedback signal to the second driving unit.

The second driving unit is configured to control the Flyback circuit to operate in the limited-current mode by using the second current loop in a case that it is determined that the output current of the Flyback circuit is greater than the third predetermined current based on the second feedback signal, and control the Flyback circuit to operate in the constant-voltage mode by using the second voltage loop in a case that it is determined that the output current of the Flyback circuit is less than or equal to the third predetermined current based on the second feedback signal In the embodiment, another implementation of the mode control module is provided. That is, in a case that the front-stage Flyback circuit is a secondary side feedback control circuit, the second voltage loop, the second current loop, the optocoupler and the second driving unit are arranged in the mode control module.

The second voltage loop is configured to output a constant voltage based on the output voltage of the Flyback circuit and the second reference voltage Vref3. The second current loop is configured to detect the output current of the Flyback circuit, and feedback the second feedback signal back to the optocoupler based on the output current of the Flyback circuit and the second reference current Vref4. After receiving the second feedback signal from the second current loop, the optocoupler transmits the second feedback signal to the second driving unit. After receiving the second feedback signal from the photocoupler, the second driving unit determines whether the output current of the front-stage Flyback circuit is greater than the third predetermined current based on the second feedback signal. In a case that the output current of the front-stage Flyback circuit is greater than the third predetermined current, the second driving unit controls the front-stage Flyback circuit to operate in the limited-current mode by using the second current loop. In a case that the output current of the front-stage Flyback circuit is less than or equal to the third predetermined current, the second driving unit controls the front-stage Flyback circuit to operate in the constant-voltage mode by using the second voltage loop. In actual operations, the second voltage loop may be constructed by using a comparator U, a resistor R and a capacitor C and the second current loop may be constructed by using a comparator U, a resistor R and a capacitor C, which may refer to FIG. 6 and is not described in detail herein.

Apparently, with the technical solutions according to the embodiments of the present disclosure, the flexibility and diversity of the mode control modes are further improved.

The embodiments in the description are described in a progressive manner. Each of the embodiments is mainly focused on describing its differences from other embodiments, and references may be made among these embodiments with respect to the same or similar parts. Finally, it should be further illustrated that a relation term such as "first" and "second" herein is only used to distinguish one entity or operation from another entity or operation, and does not necessarily require or imply that there is an actual relation or sequence between these entities or operations. Moreover, the terms "comprise", "include", or any other variants thereof are intended to encompass a non-exclusive inclusion, such that the process, method, article, or device including a series of elements includes not only those elements but also those elements that are not explicitly listed, or the elements that are inherent to such process, method, article, or device. Unless explicitly limited, the statement "including a . . . " does not exclude the case that other similar elements may exist in the process, the method, the article or the device other than enumerated elements.

The LED driving circuit according to the present disclosure is introduced in detail above. The principles and implementations of the present disclosure are described with specific examples. The above descriptions of the embodiments are only used to facilitate understanding of the method and the core idea of the present disclosure. In addition, for those skilled in the art, variations may be made to the embodiments and the application range based on the idea of the present disclosure. Therefore, the specification should not be understood as limitation of the present disclosure.

The invention claimed is:

1. An LED driving circuit, comprising:
    a Flyback circuit operating in a limited-current mode or a constant-voltage mode, configured to output a direct current voltage;
    a non-isolated DC-DC circuit, configured to convert the direct current voltage to a target direct current power to power an LED load; and
    a control circuit, configured, when the LED driving circuit is started, to:
        detect an output voltage of the Flyback circuit to obtain a detected output voltage, and control the Flyback circuit to operate in the constant-voltage mode and control the non-isolated DC-DC circuit to start operating in a case that the detected output voltage is greater than or equal to a first predetermined voltage; and
        detect a switch current or an output current of the Flyback circuit to obtain a detected output current, and control the Flyback circuit to operate in the limited-current mode to output with a reduced power in a case that the detected output current is greater than a first predetermined current;
    wherein the non-isolated DC-DC circuit outputs a second predetermined current, and the second predetermined current is greater than the first predetermined current; and
    wherein the control circuit further comprises:
        a mode control module, configured to control the Flyback circuit to operate in the limited-current mode in a case that the output current or the switch current of the Flyback circuit is greater than a third predetermined current, and control the Flyback circuit to operate in the constant-voltage mode in a case that the output current or the switch current of the Flyback circuit is less than or equal to the third predetermined current.

2. The LED driving circuit according to claim 1, wherein in a case that the non-isolated DC-DC circuit has a boost topology structure, the first predetermined voltage is equal to 20% to 80% of a maximum output voltage of the non-isolated DC-DC circuit.

3. The LED driving circuit according to claim 1, wherein in a case that the non-isolated DC-DC circuit has a buck topology structure, the first predetermined voltage is equal to 1.1 times to 2 times a maximum output voltage of the non-isolated DC-DC circuit.

4. The LED driving circuit according to claim 1, wherein the first predetermined voltage is equal to an output voltage of the Flyback circuit operating in the constant-voltage mode.

5. The LED driving circuit according to claim 1, wherein the Flyback circuit is a primary side feedback control circuit or a secondary side feedback control circuit.

6. The LED driving circuit according to claim 1, wherein the non-isolated DC-DC circuit is a Buck circuit.

7. The LED driving circuit according to claim 1, wherein in a case that the Flyback circuit is the primary side feedback control circuit, the mode control module comprises:
    a first voltage loop, configured to output a constant voltage based on the output voltage of the Flyback circuit and a first reference voltage;
    a first current loop, configured to detect the switch current of the Flyback circuit, and feedback a first feedback signal to a first driving unit based on the switch current of the Flyback circuit and a first reference current; and
    the first driving unit, configured to control the Flyback circuit to operate in the limited-current mode by using the first current loop in a case that it is determined that the switch current of the Flyback circuit is greater than the third predetermined current based on the first feedback signal, and control the Flyback circuit to operate in the constant-voltage mode by using the first voltage loop in a case that it is determined that the switch current of the Flyback circuit is less than or equal to the third predetermined current based on the first feedback signal.

8. The LED driving circuit according to claim 1, wherein in a case that the Flyback circuit is the secondary side feedback control circuit, the mode control module comprises:
    a second voltage loop, configured to output a constant voltage based on the output voltage of the Flyback circuit and a second reference voltage;
    a second current loop, configured to detect the output current of the Flyback circuit, and feedback a second feedback signal to an optocoupler based on the output current of the Flyback circuit and a second reference current;
    the optocoupler, configured to transmit the second feedback signal to a second driving unit; and
    the second driving unit, configured to control the Flyback circuit to operate in the limited-current mode by using the second current loop in a case that it is determined that the output current of the Flyback circuit is greater than the third predetermined current based on the second feedback signal, and control the Flyback circuit to operate in the constant-voltage mode by using the second voltage loop in a case that it is determined that the output current of the Flyback circuit is less than or equal to the third predetermined current based on the second feedback signal.

* * * * *